Jan. 16, 1945.   M. C. TEAGUE   2,367,628
RESILIENT SEAT CONSTRUCTION
Filed Jan. 23, 1942   3 Sheets-Sheet 1
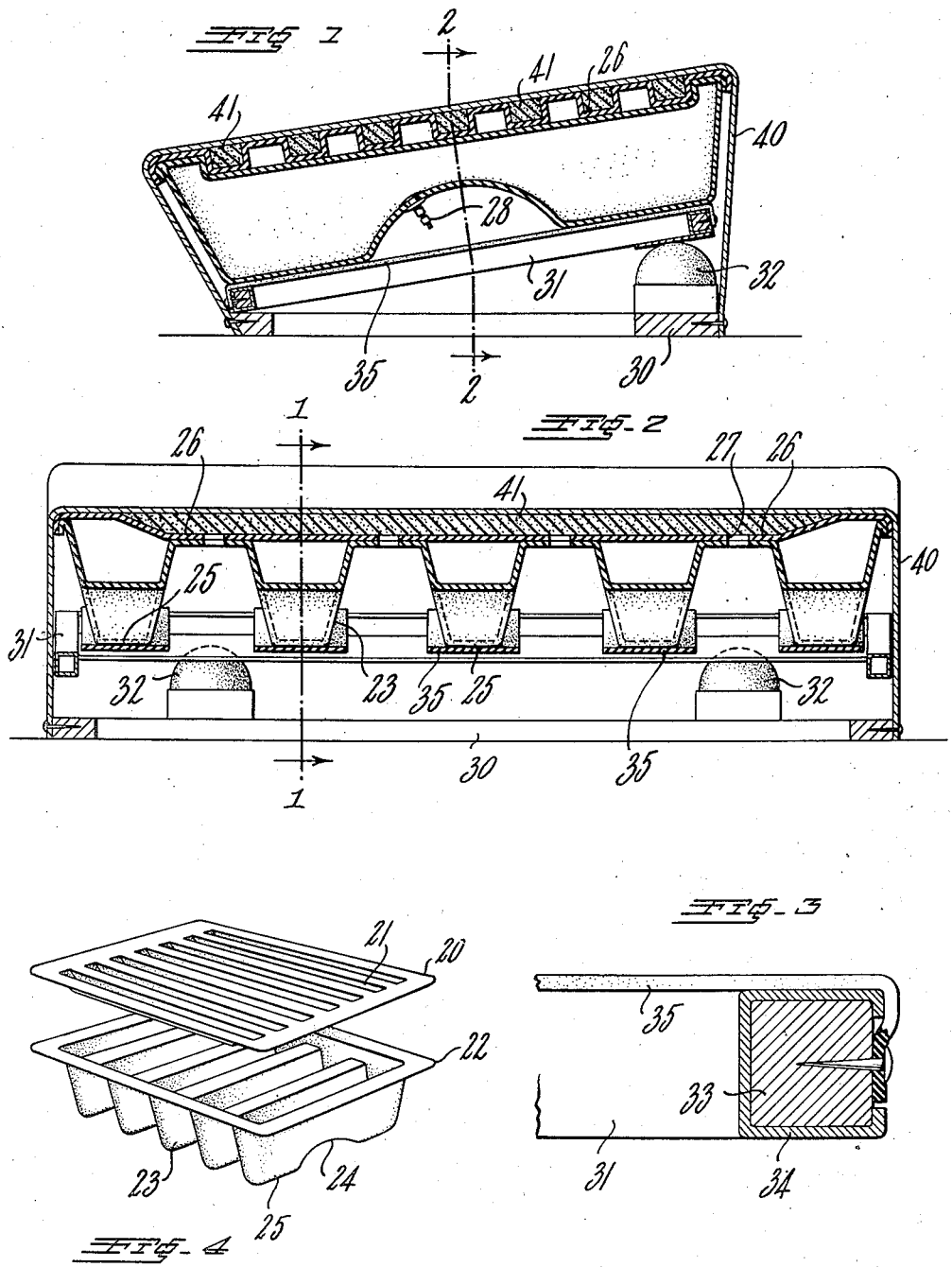
INVENTOR.
MERWYN C. TEAGUE
BY
ATTORNEY

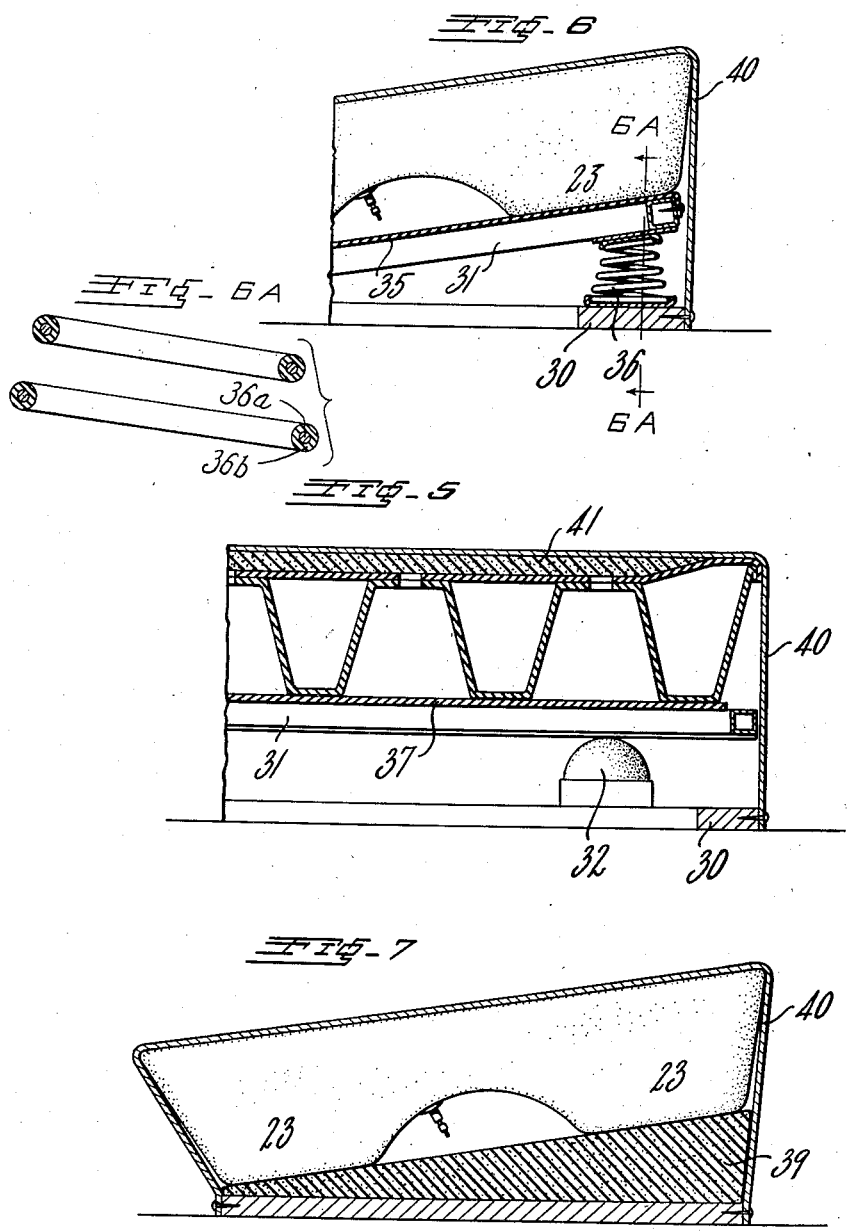

Jan. 16, 1945.  M. C. TEAGUE  2,367,628
RESILIENT SEAT CONSTRUCTION
Filed Jan. 23, 1942   3 Sheets-Sheet 3
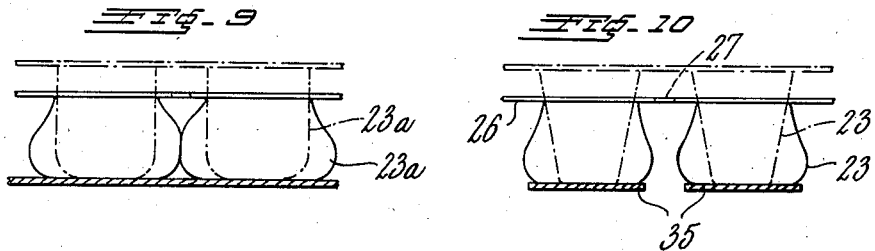
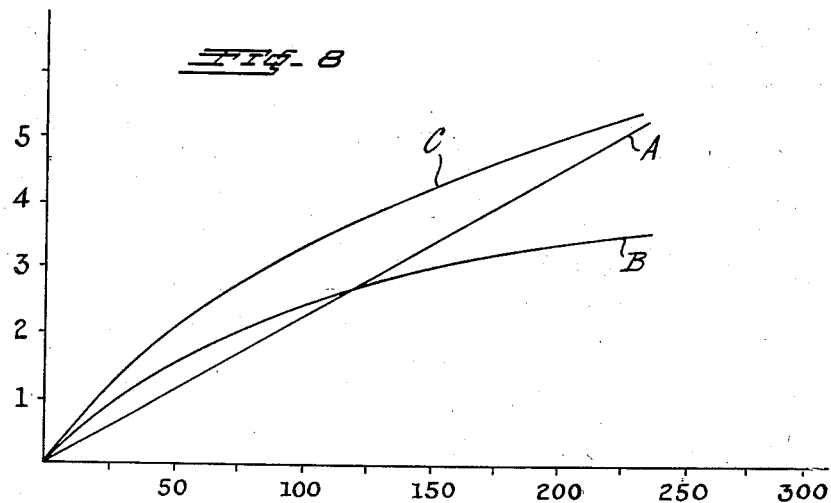
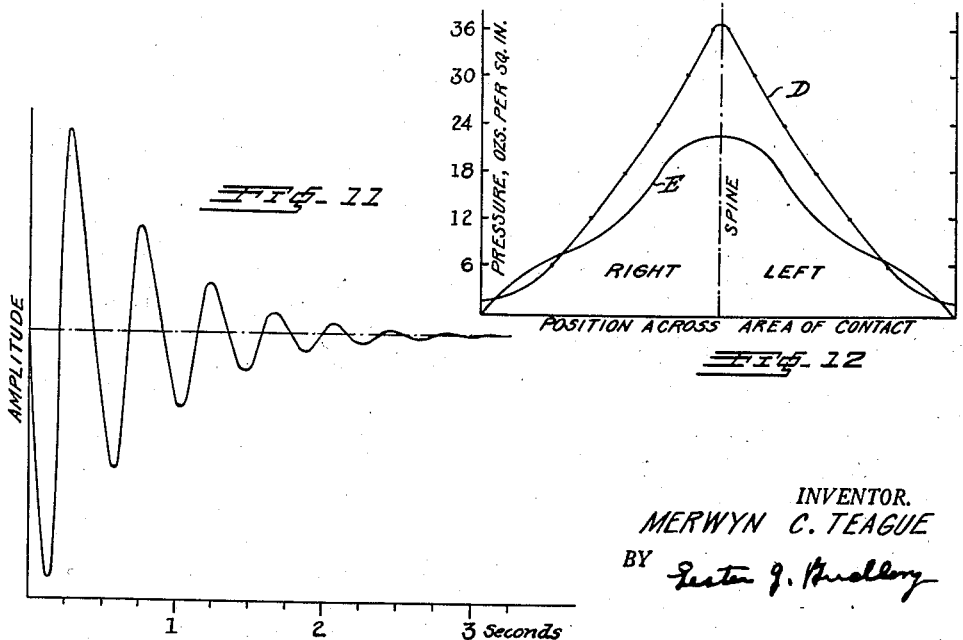
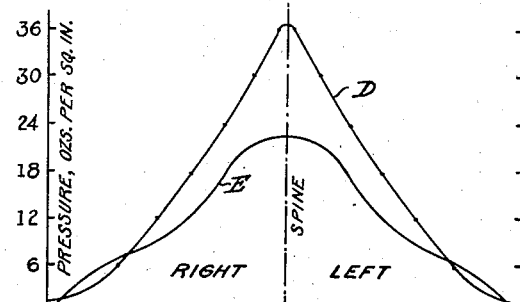
INVENTOR.
MERWYN C. TEAGUE
BY
ATTORNEY Patented Jan. 16, 1945

2,367,628

UNITED STATES PATENT OFFICE 2,367,628

RESILIENT SEAT CONSTRUCTION

Merwyn C. Teague, Ridgewood, N. J., assignor to United States Rubber Company, New York, N. Y., a corporation of New Jersey Application January 23, 1942, Serial No. 427,886

2 Claims. (Cl. 155—179)

This invention relates to resilient seat constructions, and especially to motor vehicle seats embodying inflated cushions. It is among the general objects of the invention to improve the stability, comfort and riding qualities of such pneumatic seats and to extend the comfortable characteristics over greater ranges of operating conditions and passenger weights than has been accomplished.

In the attempts which have been made to provide comfortable motor vehicle seats by utilizing the obvious resilience and self-fitting characteristics of inflated cushions, various difficulties and limitations have been encountered which have prevented the production of a successful cushion or seat, and as far as I am aware, pneumatic cushions have not been generally adopted for motor vehicle seats. In fact, in recent years, the trend of engineering development and design has been directly away from inflated cushions and toward other types of cushions. Although attempts to increase the comfort and stability of inflated cushions have been made, for example, as shown in the patents to Sampson No. 1,993,228 and O'Dell No. 2,239,300, these have not attained the degree of comfort and stability required under present day driving conditions, either in passenger cars, or more particularly in trucks.

I have discovered that when an inflated cushion, for example one of the general type illustrated by Sampson is supported on certain types of resilient support, the combination of the cushion and resilient support has characteristics not attained by any cushions which have come to my attention. I have also discovered that the stability, riding comfort, and range of comfortable operation of inflated cushions (both as to driving conditions and passenger weights) can be considerably improved by utilizing elastic sheet material for the covering or upholstery which covers the cushion proper and holds it in place on its supporting means.

Accordingly, it is among the objects of my invention to provide a seat which has improved comfort over a wide range of driving conditions and passenger weights, one which is stable, one which will absorb high frequency vibrations of relatively short amplitude, such as jiggling caused by vibration or small roughnesses in the road, as well as single bumps or low frequency vibrations of greater amplitude such as are caused by bad bumps or very rough roads, and one which prevents the inducing of sympathetic vibrations by periodic motion caused by the chassis suspension.

Another object is to provide a seat in which the rebound is comfortably checked and the induced vibrations are effectively damped in the correct period for maximum passenger comfort, neither too quickly nor too slowly.

Other objects and advantages will be apparent from the accompanying description and drawings, in which:

Fig. 1 is a longitudinal section of one form of seat embodying my invention;

Fig. 2 is a cross section taken on the line 2—2 of Fig. 1;

Fig. 3 is an enlarged section in a plane parallel to the plane of the paper in Fig. 1 showing a detail of a supporting frame;

Fig. 4 is an exploded perspective view of the inflatable cushion;

Fig. 5 is a portion of a section corresponding to Fig. 2 showing a modified form of cushion support;

Fig. 6 is a section corresponding to Fig. 1 showing still another modification;

Fig. 6A is an enlarged sectional view of a portion of a spring, taken on the lines 6A—6A of Fig. 6;

Fig. 7 is a section corresponding to Fig. 1 showing another modified form of the invention;

Fig. 8 shows the load-deflection characteristics of various seats;

Fig. 9 is a view in section corresponding to Fig. 2 of a portion of a cushion of the prior art, when stretched under load;

Fig. 10 is a view corresponding to Fig. 9 of my improved cushion similarly stretched;

Fig. 11 is a typical vibration curve of a seat constructed in accordance with my invention;

Fig. 12 shows the distribution of contact pressure between a passenger and various cushions.

I prefer to use a cushion as shown in Fig. 4, made of thin, stretchable rubber composition. This may be formed by securing together two halves 20 and 22. The upper half 20 is formed with a relatively large number of relatively small ribs 21 the tops of which define a passenger-supporting surface. The lower half 22 is formed with a relatively small number of relatively large depending lobes 23 preferably formed with arches 24 as shown, and having lower supporting surfaces 25 all of which surfaces constitute or define a lower supporting surface for the whole cushion. The two halves may be vulcanized together around their edges to form an air-tight container, and the portions between the ribs (which cross the lobes) are attached to the portions between the lobes as indicated at 26 in Fig. 2, so that the ribs form relatively restricted ducts connecting the lobes. These areas of attachment preferably extend over the entire area of the spaces between the lobes which are in contact, and holes 27 are formed through the connected portions to provide communication permitting air to circulate between the top and bottom of the outside of the cushion, as the cushion is repeatedly flexed or deflected under load, thus cooling the seat in warm weather. The cushion is provided with a valve-stem 28 by which it may be inflated to the desired pressure.

As shown in Fig. 2 the cross section of the lobes tapers toward the bottom, in order to allow each lobe to stretch a large amount under load without coming in contact with adjacent lobes, as will be explained. The crossing of the upper ribs and lower lobes contributes to the stability of the cushion, as is known, and I prefer to place the cushion with the lobes running lengthwise of the vehicle, as this reduces the tendency of the passenger to roll sidewise.

After the seat has taken up the static load of a passenger, and viewed only from the standpoint of absorbing shocks, it is desirable for a seat to deflect in proportion to the load applied. Such a seat may be said to have a constant specific deflection, that is it deflects the same amount for a given increment of load, regardless of the amount of load applied. The deflection plotted against load is thus a straight line, as shown at A in Fig. 8.

Not only should the deflection-load graph be a straight line, but it should also have a slope within fairly definite limits. In other words, the amount which the passenger deflects the cushion must be great enough to absorb the jolt comfortably, but must not be so great that either an uncomfortable amount of movement is permitted, or the passenger be allowed to strike bottom, that is hit the rigid support which is necessarily below any cushion or seat. Moreover, practical automobile design provides only a limited amount of space for such movement, and this further restricts the permissible movement within which the shock must be absorbed.

Pneumatic cushions heretofore proposed have a deflection-load curve of the type represented by the line B in Fig. 8. In this it will be observed that the deflection tends to reach a maximum in the upper range of operation and that in this range, increase of load (represented by increased severity of a bump) does not increase appreciably the deflection of the cushion. This is represented by a decrease in specific deflection and is felt by the passenger as a hardening of the seat, which appears to become solid. For this reason pneumatic cushions heretofore proposed have proved uncomfortable in motor vehicle operation. On the other hand, if the cushion were made soft enough to reduce this hardening to comfortable limits within the range of severity of bumps reasonably expected, the cushion became objectionably soft for two reasons. First, it lets the passenger hit bottom on relatively mild jolts or bumps. Second, it did not afford a satisfactorily firm support for the passenger, particularly at the edges of the seat, and this in turn had two other undesirable results. It permitted sliding or rolling off the seat when the door of the vehicle was open, as well as undue and uncomfortable swaying on curves.

The softness of the cushion can be appreciably increased without sacrificing stability by shaping and proportioning the lobes 23 as shown in Fig. 2 so that the sides of one lobe do not touch the sides of the adjacent lobes when the lobes stretch under the pressure of load on the cushion. Fig. 9 shows how the lobes of a cushion of the type shown by the O'Dell Patent No. 2,239,300 stretch under load. The dotted lines show the form and position of the lobes 23a when the cushion is not loaded. If the cushion is designed with sufficient stretchable rubber in the lobes to give the desired softness and if the lobes are made sufficiently wide to be stable, then under the load applied by a normal passenger the lobes stretch as shown in the solid lines until adjacent lobes touch each other. Contact prevents or materially restricts further stretching of the lobes and the seat appears to become hard. I have found that this hardness can be avoided or moved out of the range of practical operating conditions by tapering and proportioning the lobes as shown in Fig. 2. This prevents contact and permits continued stretching under the influence of loads encountered within the practical limits of operation. This condition is shown in Fig. 10 in which the dotted lines represent the unloaded lobes 23 corresponding to Fig. 2 and the solid lines show the form and position of the lobes when stretched under load.

In accordance with my invention the cushion is mounted upon a resilient support which, in the upper range of operating loads, has a higher specific deflection than the cushion, that is deflects more under a given increment of load than does the inflated cushion. Preferably this support is of damped elastic material and supports the entire area of the supporting surface of the cushion. The structure by which this is effected is described below.

In Figs. 1 and 2, I have shown the preferred form of such support for a passenger car of particular weight and design. In this form of the invention, a rigid car seat support 30 of conventional construction forms the foundation of the seat. A relatively rigid floating frame 31 is supported at its front edge by one or more resilient supports 32. The back edge of the frame may rest on the support 30 or it, too, may be supported on resilient mountings. I have found, however, that a seat of desirable characteristics is provided by supporting the front edge only on resilient supports. Elastic sheet material is stretched over the frame, and may be secured thereto by tacking the edges to a wooden or composition tacking strip 33 held within a channel-shaped steel frame member 34, as shown in Fig. 3. This sheet is supported at its front and back edges only, in order to permit it to stretch under the load of the cushion and passenger. Preferably the sheet is in the form of individual straps 35 tacked at their ends to the front and back of the frame, each strap supporting one lobe independently of the other lobes of the cushion and being of a width to support substantially the entire supporting surface of that lobe even when the lobe is stretched as shown in Fig. 10. The lobes may be held in place on the straps in any desired manner. As one suitable material for the elastic support I use a stretchable material including textile fabric dipped or coated with stretchable rubber to produce a composite strap having a total linear stretchability of about 70% of its relaxed length, the fabric forming a stop for the rubber when stretched. This may be stretched 50% initially when tacked on the frame that is, stretched to 135% of its relaxed length.

In this construction a sudden increase of load applied to the seat by the weight of the passenger when the car strikes a bump is absorbed by all three elastic means, the cushion, the straps and the elastic supports 32. However during different periods of time in the total deflection of the seat under the influence of the jolt, different proportions of the deflection are absorbed by the individual components automatically. As the load starts to increase the pressure of the air in the cushion increases, the straps stretch and the resilient supports 32 are compressed but in this initial stage the cushion itself is permitted to deflect by the stretching of the rubber in the lobes to a much greater extent than the deflection either of the straps or resilient supports 32. At some definite point in the deflection of the upper surface of the cushion itself, the pressure of the confined air reaches a value at which the cushion feels uncomfortably hard to the passenger. Any attempt to absorb the force of a jolt by further distortion of the cushion alone would unduly increase the pressure and would be uncomfortable to the passenger. As the pressure approaches this point at which the cushion tends to appear uncomfortably hard the supporting straps continue to stretch. They deflect more than the cushion does at this point, and permit further deflection of the passenger-supporting surface. However, the specific deflection of the straps at this point, that is the deflection for each unit of load, is less than the specific deflection of the cushion alone up to this point. Consequently while the straps permit further deflection of the passenger supporting surface, they decrease the amount of deflection for a unit of load. After the straps have stretched a certain amount, their specific deflection decreases so that any further attempt to absorb the force of a jolt by further stretching of the straps would be uncomfortable to the passenger. As the load further increases to this point where the force exerted by the straps again tends to make the seat appear uncomfortably hard, further comfortable deflection of the seat is permitted by further compression of the resilient supports 32. Thus, the seat is initially soft and deflects a relatively large amount for small jolts, offering increased resistance to deflection under load so that deflection for greater loads approaches proportionality to the increase in load. A typical deflection-load curve for a seat such as described is shown at C in Fig. 8. This seat is very soft at the lower load ranges, becoming firmer in the upper load ranges, while maintaining in the upper load ranges, a deflection characteristic approaching a straight line. In Fig. 5 a modified form of elastic sheet for supporting the cushion is shown. This is a single sheet 37 covering the entire bottom of the cushion including the spaces between the lobes and supported only at its edges by tacking to the frame 31 preferably at the front and back edges only. This single elastic sheet has properties similar to the elastic straps 35 for supporting the cushion but has different load-deflection characteristics and a different damping factor.

Two other factors which must be taken into consideration in providing a seat of the desired comfort are the frequency of the vibrations which are induced in the seat itself when the car hits a bump and the attenuation of these vibrations, that is, the period within which they are damped to a negligible amplitude. The initial amplitude will be governed by the deflection-load characteristics of the seat and the severity of the bump.

The frequency of the vibrations is influenced by the amount of load and by the resilience of the cushion itself and this is affected by the inflation pressure, the amount of stretchable rubber in the cushion and the modulus of elasticity of this rubber. The frequency is also influenced by the elasticity and arrangement of the support on which the cushion is mounted. These factors can be varied widely within the scope of my invention to provide a frequency under normal operating conditions with an average passenger which will be within comfortable limits, for example, between 127 and 180 oscillations per minute.

The invention is also concerned with the controlling of the damping of the induced vibrations. The damping is influenced by the inflation pressure, the amount of stretchable rubber in the cushion and its modulus and by the damping characteristics of the elastic supports on which the cushion is mounted. The inherent damping of induced oscillations in the elastic straps supporting the cushion and the resilient supports 32 which support the frame can be varied within the scope of the invention to effect the desired damping according to the type of service and conditions of operation for which the cushion is intended. Preferably, I utilize the inherent damped elastic characteristics of sponge rubber of relatively high modulus for the elastic supports 32 which may be conveniently made as molded sponge rubber hemispheres as shown in Fig. 1.

Fig. 11 shows a typical vibration curve for the form of seat shown in Fig. 1. In this the amplitude of the oscillations is plotted as ordinates against time as abscissae.

Fig. 6 shows a modified form of the invention which may be used under different requirements of damping for the elastic supports which uphold the frame. In this modification springs 36 may be substituted for the sponge rubber balls 32 and the springs suitably damped as desired by surrounding or embedding them in rubber, as shown in Fig. 6A, wherein 36a represents the metal spring proper and 36b the surrounding rubber damping layer.

Fig. 7 shows another form of damped elastic support for the cushion. In this modification a block 39 which may be wedge-shaped as shown is formed of curled fibers such as hair or tula coated or impregnated with latex which provides in effect a large number of small springs held together and damped by a frictional coating of rubber. Alternatively, the block may be formed of sponge rubber. The stiffness or modulus of the pad may be selected to give the inflated cushion the desired firmness of support and the desired damping and the thickness of the block may be selected to give the seat the desired deflection under load.

For the sake of appearance, and in order to hold the seat assembly together, I cover the inflated cushion with a sheet of material secured to the support 30. In vehicle seats heretofore constructed this is upholstery fabric, usually over a layer of padding, for example, hair or cotton wadding or other relatively soft, although relatively inelastic material. I have discovered that the comfort of the seat is materially increased by using elastic instead of inelastic material for this covering.

Considering the static comfort of any seat, that is the feeling of the seat on the passenger when the car is stationary or without considering deflection or damping characteristics, the most comfortable seat is one which exerts the lowest maximum pressure on the body of the passenger. The area of contact does not change markedly with varying pressure, so that a passenger has a substantially constant area of contact with the seat. Consequently, if the pressure is uniform, the pressure on all spots will be the lowest possible, and points of high pressure will be avoided. The avoidance of such points of high pressure is important in eliminating fatigue on long drives. If a passenger could sit directly on a perfectly flexible inflated envelop or bag, the pressure on the area of contact would be substantially uniform, but it is impractical to attain this theoretically perfect condition, and in most cases there is a considerable variation of pressure from point to point, of pneumatic cushions as heretofore constructed and used. I believe this variation of pressure from the theoretical uniform pressure depends upon the amount and kind of clothing worn by the passenger and the amount and kind of covering on the cushion. Experience shows that large amounts of inelastic material between the body of the passenger and the cushion, for example coats and upholstery material, cause a relatively large variation of pressure from point to point. I have found that covering my pneumatic cushion with elastic instead of the customary inelastic material materially decreases the variation of pressure over the area of contact, effecting a more nearly uniform contact pressure, thus avoiding spots of high pressure, and markedly improving comfort and preventing fatigue. This is apparently due to the fact that the elastic covering permits a closer approach to the theoretically perfect condition of a passenger sitting on a single chamber fluid filled elastic cushion without intervening clothing or upholstery.

Accordingly, I cover the inflated cushion with a sheet of elastic material, 40, preferably one which is elastic in both directions, that is having the elastic or stretching properties of thin sheet rubber. This is stretched with the desired tension over the inflated cushion, and may be tacked or otherwise secured to the support 30. Since the feel and appearance of pure sheet rubber is objectionable, I prefer to use a material such as that marketed under the trade name Luvon which has the appearance and feel of cloth, but is stretchable or elastic in both directions, having in this respect the characteristics of sheet gum rubber. A part of the advantage of this material may be obtained by using material which stretches in one direction only, there being many composite rubber and cloth fabrics having this characteristic.

In some instances it may be desirable in order to provide a perfectly smooth upper surface for the cushion, to fill the spaces between the ribs on the upper surface. Where this is the case, I prefer to use elastic material, of low modulus, such as soft sponge rubber indicated at 41 in Fig. 1. This may be laid in the grooves in strips and cemented in place, or it may be formed in situ by applying latex foam to the upper half of the cushion during the process of manufacture.

In Fig. 12, the actual contact pressures between a passenger and a conventionally upholstered cushion constructed in accordance with Fig. 4 (curve D), are compared with the contact pressures between the same passenger and a similar cushion upholstered with elastic material in accordance with my invention as shown in Figs. 1 and 2 (curve E). In these curves contact pressure is plotted as ordinates against abscissae representing the position across the body of the passenger of the points at which the measurements were taken. In both cases the pressure is highest in the center area surrounding the spine and decreases substantially to zero at the edges of the contact area, but the maximum pressure attained with the elastic covering is only about two-thirds of the maximum pressure attained with the conventional covering because the weight of the passenger is distributed more evenly. With the elastic covering the pressure at and near the edges is higher than the pressure at these points with the inelastic cover, but the values of these higher pressures at or near the edges are well within the limits of comfort. The cushion with the elastic cover has the advantage of eliminating the sharp peak and high pressure of the curve D. The integrated areas of the curves D and E are not the same, as might be expected on superficial consideration, because the pressures plotted in Fig. 12 are those taken in a straight line across the body of a passenger and represent pressures in the plane of this line only. While the weight of the passenger is the same in each case and thus the total integrated pressure over the whole seat must be the same in both cases, the integrated pressures in any one plane need not be the same in both cases.

Having thus described my invention, what I claim and desire to protect by Letters Patent is:

1. In a seat construction in combination, a floating frame, a rigid base frame for supporting the floating frame, resilient supporting means between the base frame and at least one edge of the floating frame, an inflatable pneumatic cushion disposed to support a load applied in a substantially vertical direction and having a plurality of pneumatically interconnecting depending lobes separated from each other by a distance greater than the space required for normal deflection of the lobes to avoid mechanical contact when under load, said lobes constituting the entire supporting surface of the cushion, a strip of flexible sheet material supported under tension by the floating frame for supporting each lobe of the cushion independently of the other lobes, said strips forming the sole support of said cushion between its edges and said resilient supporting means having a smaller specific deflection to vertical loads than the specific deflection to vertical loads of the cushion and having different vibration characteristics than the vibration characteristics of the cushion whereby the reaction of the cushion to high frequency but relatively low amplitude vibrations is softer than the reaction of the resilient supports and the resilient supporting means deflect to permit movement of the cushion as a whole under the influence of severe shocks, and an elastic cover engaging the upper surface of the cushion and secured at its edges only to said base frame, the cover being movable independently of the cushion and relative to the surface of the cushion to permit relative adjustment of the cushion and cover under applied load to preserve equality of pressure exerted by the cushion on unit areas of the load.

2. In a seat construction in combination, a floating frame, a rigid base frame for supporting the floating frame, resilient supporting means between the base frame and at least one edge of the floating frame, an inflatable pneumatic cushion disposed to support a load applied in a substantially vertical direction and having a plurality of pneumatically interconnecting depending lobes separated from each other by a distance greater than the space required for normal deflection of the lobes to avoid mechanical contact when under load, said lobes constituting the entire supporting surfaces of the cushion, a stretchable strip of sheet material supported under tension by the floating frame for supporting each lobe of the cushion independently of the other lobes, said strips forming the sole support of said cushion between its edges and said strips having a smaller specific deflection to vertical loads than the specific deflection to vertical loads of the cushion and having different vibration characteristics than the vibration characteristics of the cushion whereby the reaction of the cushion to high frequency but relatively low amplitude vibrations is softer than the reaction of the elastic strips, and the elastic strips deflect to permit movement of the cushion as a whole under the influence of severe shocks, and an elastic cover engaging the upper surface of the cushion and secured at its edges only to said base frame, the cover being movable independently of the cushion and relative to the surface of the cushion to permit relative adjustment of the cushion and cover under applied load to preserve equality of pressure exerted by the cushion on unit areas of the load.

MERWYN C. TEAGUE.